United States Patent [19]

Cuevas et al.

[11] Patent Number: 4,706,909
[45] Date of Patent: Nov. 17, 1987

[54] CONTROLLABLE EJECTION SEAT CATAPULT

[75] Inventors: Jess A. Cuevas, Scottsdale; Robert D. Blackshire, Glendale, both of Ariz.

[73] Assignee: The United States of America as represented by the Secretary of the Air Force, Washington, D.C.

[21] Appl. No.: 876,585

[22] Filed: Jun. 19, 1986

[51] Int. Cl.$^4$ ............................................. B64D 25/10
[52] U.S. Cl. ........................ 244/122 AC; 244/122 AE
[58] Field of Search ........ 244/122 R, 122 A, 122 AB, 244/122 AC, 122 AD, 122 AE

[56] References Cited

U.S. PATENT DOCUMENTS

| | | | |
|---|---|---|---|
| 3,027,125 | 3/1962 | Fulton | 244/122 |
| 3,035,796 | 5/1962 | Glass | 244/122 AD |
| 3,124,324 | 3/1964 | Martin | 244/122 |
| 3,355,127 | 11/1967 | Stanley et al. | 244/122 |
| 3,688,636 | 9/1972 | Spiess et al. | 89/1.8 |
| 4,396,171 | 8/1983 | Schultz | 244/122 AD |
| 4,505,444 | 3/1985 | Martin | 244/122 AE |

OTHER PUBLICATIONS

Paper presented by Mr. Steven J. Baumgartner of Boeing to the annual SAFE Association Symposium in Dec. 1984, entitled "Controllable Ejection Seat Catapult Program" pp. 237–245.

*Primary Examiner*—Joseph F. Peters, Jr.
*Assistant Examiner*—Rodney Corl
*Attorney, Agent, or Firm*—William G. Auton; Donald J. Singer

[57] ABSTRACT

A catapult seat ejection system for ejecting a pilot and seat from an aircraft is disclosed in which the thrust of the catapult is controlled to prevent injury to the pilot due to acceleration forces. The catapult comprises a main catapult tube; a piston within the tube driven by gas pressure from the burning of two solid propellants cartridges; and four shuttle vent valves powered by gas from a plurality of electrically ignited squibs controlled by an electronic control system. The catapult is initially driven by only one of the two solid propellant cartridges and the electronic controller continuously monitors acceleration. If acceleration is too great the controller fires squibs with a control signal to open the shuttle vent valves to vent the gasses from the catapult and thereby reduce the pressure and acceleration of the seat. If the acceleration is too low and the vent valves are closed, and the sensor fires the second cartridge with a second control signal.

3 Claims, 10 Drawing Figures

CONTROLLABLE EJECTION SEAT CATAPULT

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to aircraft safety systems, and more specifically to a catapult which provides controllable acceleration to an aircraft ejection seat.

An ejection seat catapult propels the ejection seat out of an aircraft cockpit during an emergency ejection. Conventional catapults are pneumatic piston/cylinder devices, pressurized by hot gas generated by burning a solid propellant grain. The fixed performance capabilities of open loop catapults are not satisfactory for some ejection conditions encountered in today's military aircraft. Variations in propellant temperature of −65° F. to +160° F. (required operating range of ejection seat subsystems) result in a variation in catapult thrust levels of approximately 25%. This variation together with variations of the ejected weight produce a large variation in impressed Gs on the crewmember during catapult operation. If catapult thrust is low and the ejected weight is high, the ejection velocity and trajectory height will be affected. If catapult thrust is high and the ejected weight is low, the resultant accelerations could cause injury to the crewmember. Ejection in a "G field" —that is while the aircraft is in a maneuver which loads the crewmember in the spinal axis—further increases the potential for ejection force injury.

When an ejection seat/airman combination is ejected from an aircraft in an exergency it is desireable that this combination hould attain a high velocity in predetermined direction in as hort a time as possible consistent with the application of physiologically acceptable acceleration values to the airman. It is important that the trajectory of the seat/aircraft combination should be such that the combinations will adequately clear all parts of the aircraft in any flight condition. It is also important that the combination should have sufficient time for the deployment and effective operation of the crewmember's parachute.

The task of providing an aircraft seat ejection system which possesses controllable acceleration is alleviated to some extent, by the following U.S. patents, the disclosures of which are incorporated by reference:
  U.S. Pat. No. 3,027,125 issued to Fulton;
  U.S. Pat. No. 3,124,324 issued to Martin;
  U.S. Pat. No. 3,355,127 issued to Stanley et al;
  U.S. Pat. No. 3,688,636 issued to Spiess et al;
  U.S. Pat. No. 4,396,171 issued to Schultz; and
  U.S. Pat. No. 4,505,444 issued to Martin.

The patent of Fulton describes the problems associated with a single propellant catapult and proposes the use of a large numter of explosive charges spaced along the tube to be ignited successively as the piston moves down the tube. The acceleration of the seat, is, however, not monitored or controlled.

The patent of Martin uses a plurality of rockets with selected thrust direction to cause the pilot and seat to travel in a desired direction. The acceleration of the seat is not monitored or controlled.

The reference Stanley describes the use of a flexible tow line assembly attached to the pilot and carried aloft by a rocket to pull the pilot from the aircraft when it becomes taut. It has no control over acceleration.

The patent of Spiess et al provides for presetting the thrust of the ejector to control the height the seat reahes when ejected but cannot vary the thrust during ejection.

The Schultz disclosure differs from the references described above, in that it provides for controlling acceleraton of the seat and pilot during ejection. It uses an electronic controller to sense acceleration and, if too high, vent the gas from the catapult, but it cannot increase acceleration if too low, as presently required.

From the foregoing discussion, it is apparent that there currently remains a need for a controllable seat ejection catapult which is capable of increasing and decreasing the seat acceleration to preserve the safety of an aircraft crewmember during emergencies. The present invention is intended to satisfy that need.

SUMMARY OF THE INVENTION

The present invention includes a catapult for ejecting a pilot and seat from an aircraft, so that the thrust of the catapult is controlled to prevent injury to the pilot due to acceleration forces. The catapult comprises a main catapult tube; a piston within the tube driven by gas pressure from the burning of two solid propellant cartridges; and four shuttle vent valves powered by gas from a plurality of electrically ignited squibs controlled by an electronic control system. The catapult is initially driven by only one of the two solid propellant cartridges and the electronic controller continuously monitors acceleration. If acceleration is too great the controller fires squibs to open the shuttle vent valves to vent the gasses from the catapult and therby reduce the pressure and acceleration of the seat. If the acceleration is too low and the vent valves are closed, the sensor fires the second cartridge.

It is an object of the invention to provide an aircraft seat ejection catapult which senses the acceleration applied to an aircraft seat, and is capable of increasing the acceleration when it is too low.

It is another object of the invention to provide a seat ejection system which decreases the acceleration of the ejection seat when the acceleration is too high.

Ihese objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an aircraft ejection seat catapult which provides controllable acceleration to the thrust of the seat to prevent pilot injury.

Aircraft ejection seats generally comprise a seat pan mounted on a beam or frame adapted to be ejected with the seat pan bodily along a predetermined path from the ejection seat from the aircraft in a predetermined direction relative to the aircraft, when required in an exergency. Ejection of the seat from the aircraft is generally effected by means of an ejection catapult comprising two or more telescopically cooperating parts adapted to be thrust axially apart by propulsion gases generated by the firing of at least one combustible cartridge. The ejection catapult operates between the seat frame and a fixed art of the aircraft, being located in such a position so to exert the thrust in the direction that it is desired that the ejection seat should travel as it moves from the aircraft.

Figure 1:
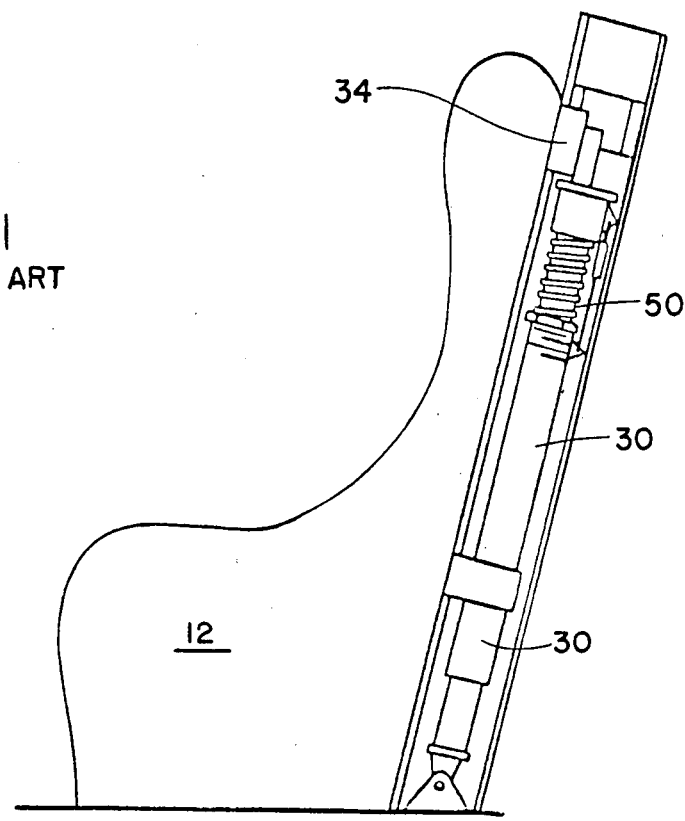
FIG. 1 is an illustration of a prior art seat ejection system.

The reader's attention is now directed towards FIG. 1, which is an illustration of the prior art seat ejection system of the Schultz reference. The seat ejection system of Schultz is an improvement over conventional systems in that it is capable of decreasing acceleration of seat ejection when required.

In the system of FIG. 1, the seat 12 is ejected by the catapult 34 by the pressure of the combustion of a solid propellant in the upper tube 30. Upon ignition, the catapult 34 is initially constrained by a spring 50 until desired maximum acceleration is reached. While the seat is being ejected, acceleration is kept from progressing for beyond maximum with a system of vents, which are uncovered when the spring 50 is depressed.

The venting of a compressed gas reduces acceleration when it exceeds a maximum. However, it is equally important to have the capability of increasing acceleration when required. The present invention provides both capabilities.

Figure 2:
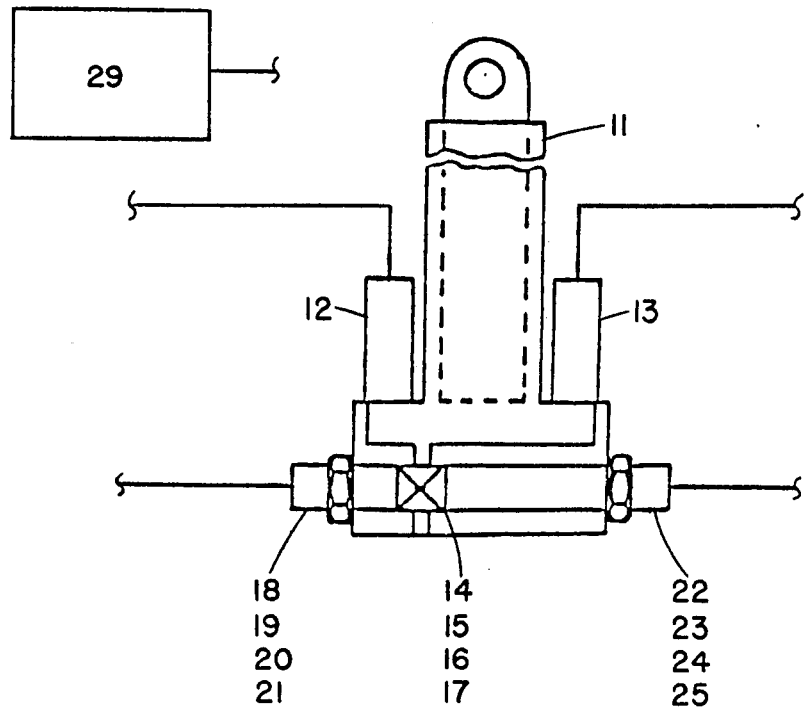
FIG. 2 is an illustration of the ejection system of the present invention.

FIG. 2 is an illustration of the controllable ejection seat catapult of the present invention. The catapult 11 is equipped with two propellant cartridges 12 and 13, and four exhaust valves 14, 15, 16 and 17. Each valve 14-17 is fitted with an opening cartrige 18, 19, 20 and 21, and a closing cartridge 22, 23, 24 and 25. In operation, an electronic controller 29 initiates ejection by firing one propellant cartridge 12. During ejection the controller receives acceleration data from an accelerometer mounted on the ejection seat and calculates the changing thrust requirements to keep the pilot/seat within the safe limits of acceleration. To lower the acceleration rate, valves 14-17 are opened singly or in combination as required to vent high pressure gas by firing their respective opening cartridges 18 - 21. Subsequently, valves 14-17 are closed to prevent over-correction by firing their respective closing cartridges 22-25. To increase acceleration, a second propellant cartridge 13 is fired to increase pressure and thrust. The electronic controller continously monitors pilot acceleration and makes the above system corrections in any sequence determined by its built-in logic program.

In the system of FIG. 2 the four exhaust valves 14-17 are controlled by a closed loop electronic control system that senses the total ejection seat acceleration (along the spinal axis) and executes a control law that determines when the second cartridge should be ignited and determines when the exhaust valves 14-17 should be opened or closed. Each exhaust valve consists of a spool that slides within a sleeve. The spool has "open" and "close" positions located at opposite ends of the sleeve. In the "close" position, the spool covers a gas vent hole. Electrically ignited propulsive squibs are located at each end of the sleeve; when ignited they drive the spool to the opposite end of the sleeve. Each valve can be operated through a single "close-open-close" cycle.

The catapult controller is one of the critical components that comprise the closed loop controllable catapult system. This controller ignites the first propellant cartridge 12 and senses the catapult acceleration throughout the catapult stroke. If the catapult acceleration is too great, then the controller fires squibs to open the exhaust valves and vent gases to reduce the catapult pressure and acceleration. If the catapult acceleration is too low, then the controller fires the squibs to close any shuttle valves that are open. If the acceleration is too low and all the valves are closed, then the second propellant cartridge is ignited. The control low time frame interval is 0.002 seconds, so every 2 msec, the controller records the current acceleration value, executes the control law software, and (if required) transmits firing signals to the catapult squibs and/or the second catapult cartridge. During nominal ejection conditions, the catapult will extend to its full stroke of 34 inches in 170 msec, so the control law will be executed 85 times as the catapult extends.

The catapult controller uses an Intel 8086 microprocessor with an Intel 8087 numeric coprocessor. Power to the controller is supplied by two battery packs; one dedicated to squib firing (12 VDC) and another (24 VDC) that feeds a converter which provides the required voltages for the rest of the controller.

The control law feeds back the total seat acceleration directly. The method used to control seat acceleration (so that the crewmember dynamic response requirements are satisfied), consists of scheduling the commanded seat acceleration. The commanded seat acceleration varies with the aircraft acceleration level existing at the time of catapult initiation.

Figure 3:
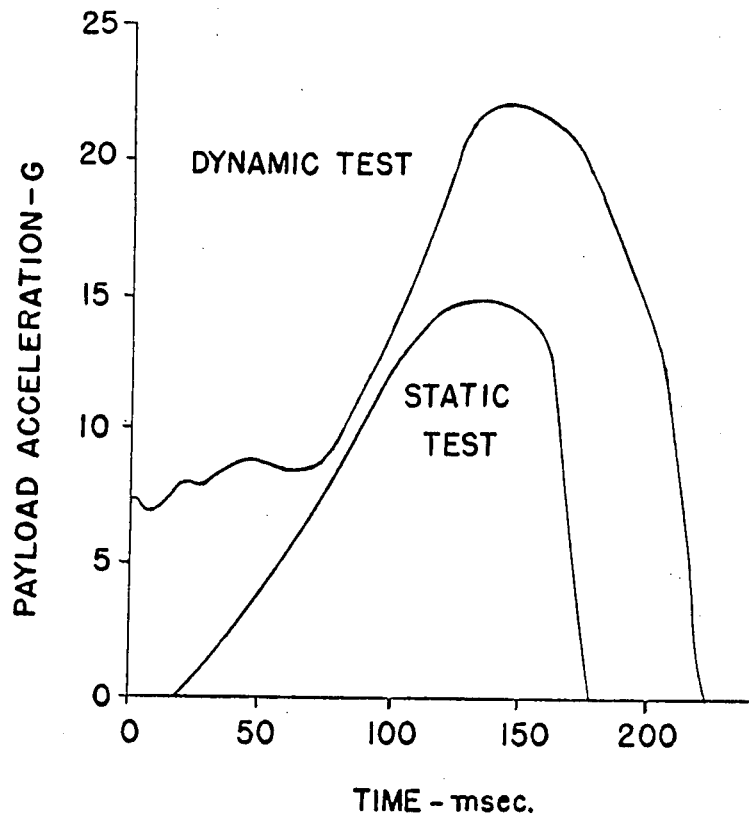
FIG. 3 is a chart depicting the effect of a G field on the acceleration of ejection seats.

FIG. 3 is a chart depicting the effect of a G field on the payload acceleration of ejection seats. This figure is the result of a test program which revealed that operation of an ejection seat catapult in an impressed G field results in crewmember loads approximately equal to the normal catapult G force plus the G force of the impressed field. The acceleration of a Talley 2400 Catapult in a static G field is compared to the same model catapult (with same propellant temperature and payload) operating in an impressed G field of approximately 8 G. The peak accelerations are 15.1 G for the static case and 22.3 G for the dynamic case—a difference of 7.2 G.

Figure 4:
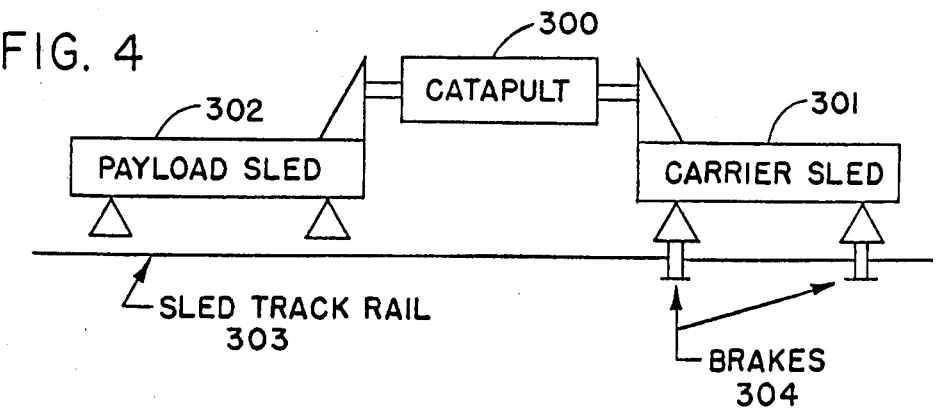
FIG. 4 illustrates a test configuration for testing the present invention.

FIG. 4 is an illustration of a test configuration which was used to test the abilities of the catapult of the present invention. This test arrangement includes the catapult 300 which is mounted between a carrier sled 301 and payload sled which ride on a steel rail 303, which is approximately 30 feet long. Lead ballast was added or removed from the payload sled to arrive at a throw weight that represented the total ejection seat and crewmember weight. After the catapult was fired, the payload sled slid down the greased rail until it hit a water brake at the opposite end of the track.

The carrier sled is a heavy sled (approximately 3000 lbs) which represents the aircraft. The payload sled represents the seat/crewmember mass. Two different payload sled weights were used for these tests, 357 lbs and 437 lbs. All of the catapult tests were conducted at ambient temperature (appoximately 70° F.)

Using the test configuration of FIG. 4, both positive and negative G catapult tests were conducted. The negative G catapult tests were accomplished by using an impulse accelerator facility to propel the sled/catapult assembly to a suitable velocity, with the payload sled ahead of the carrier sled. The pneumatic brakes of the carrier sled were then applied to create an acceleration environment that imposed tensile loads on the catapult. When the measurement accelerometer aboard the carrier sled had sensed that the desired acceleration level had been reached, then a catapult firing signal was sent to the electronic catapult controller mounted on the carrier sled. The battery powered catapult controller then controlled the firing sequence for the propellant cartridges and gas vent valves.

Positve G catapult tests were accomplished by using horizontal decelerator facility to propel the sled/catapult assembly to a suitable velocity, with the carrier sled moving ahead of the payload sled. The carrier sled brakes were then applied, which created compressive loads on the catapult. After the proper level of carrier sled acceleration was reached, the catapult was fired.

Figure 5:
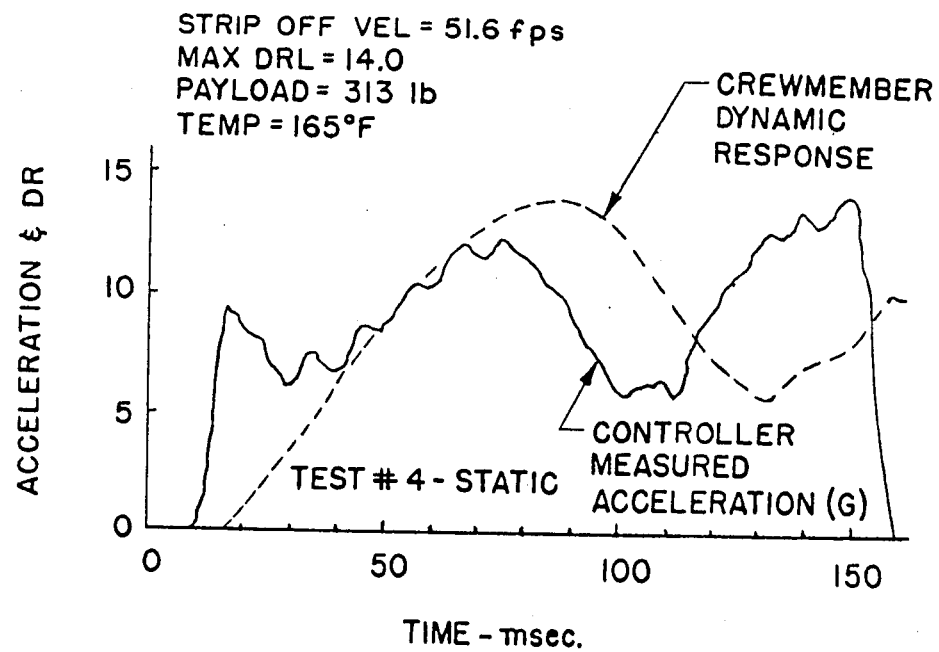
FIGS. 5–10 are charts of test results of the present invention using the configuration of FIG. 4.
Figure 6:
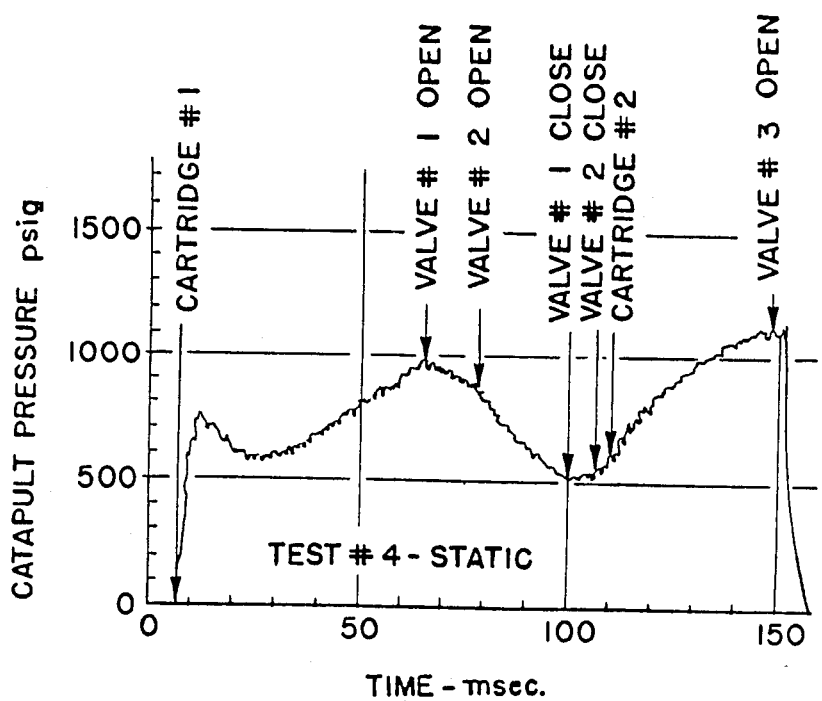

FIGS. 5 and 6 are charts depicting the results obtained using the test configuration of FIG. 4. FIG. 5 illustrates acceleration (in G) of the payload versus time. FIG. 6 illustrates the time sequence of events and catapult pressure over time. The tests of the catapult demonstrated that it is capable of providing a controllable thrust level over a wide range of ejection conditions. Shuttle valve actuation delays were found to be greater than originally expected, and the led to diminished performance for some of the ejection cases that were tested and simulated. Otherwise, the catapult hardware and software operated as expected and provided good performance.

Figure 7:
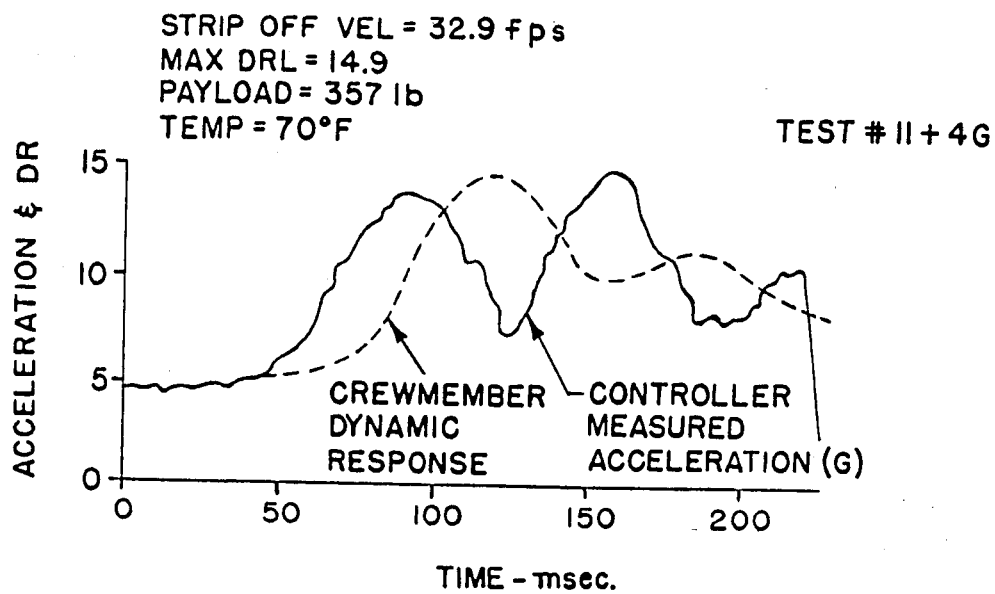
Figure 8:
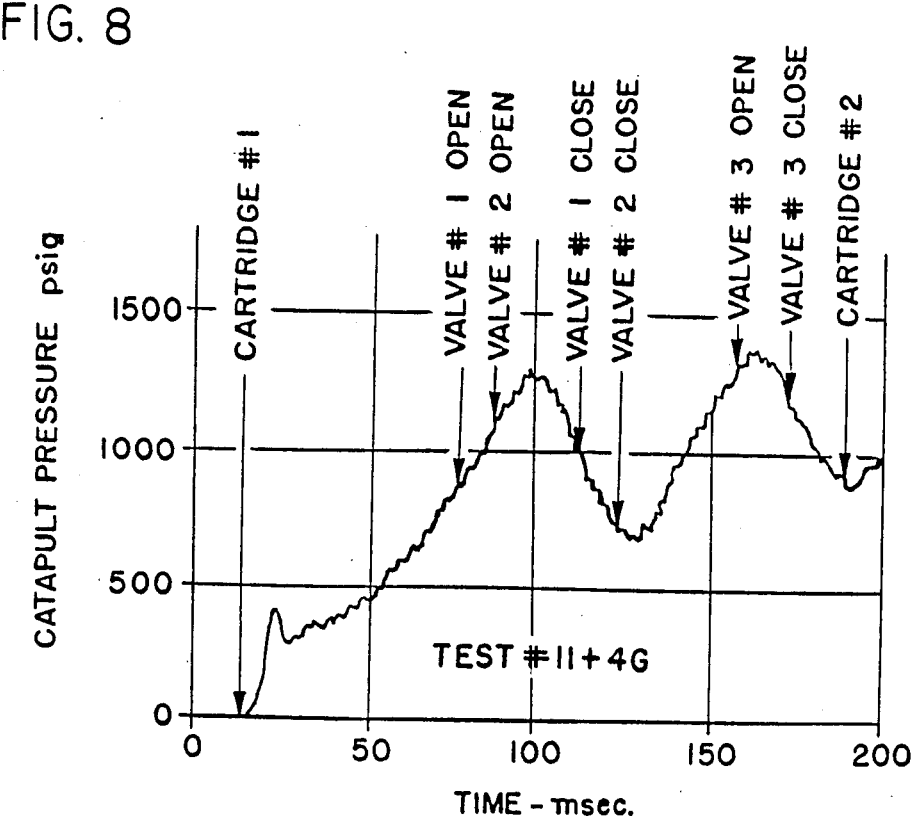

FIGS. 7 and 8 are charts depicting further testing of the catapult. FIG. 7 depicts the acceleration and dynamic response (DR) versus time and FIG. 8 depicts the catapult pressures and control events versus time. This was a +4 G test with a 357 lb payload at 70° F. All four of the shuttle valves were opened and closed during test to control the catapult acceleration level. The second cartridge was not ignited until near the end of the catapult stroke. The catapult reached full stroke after 236 msec with a stripoff velocity of approximately 33 fps.

Figure 9:
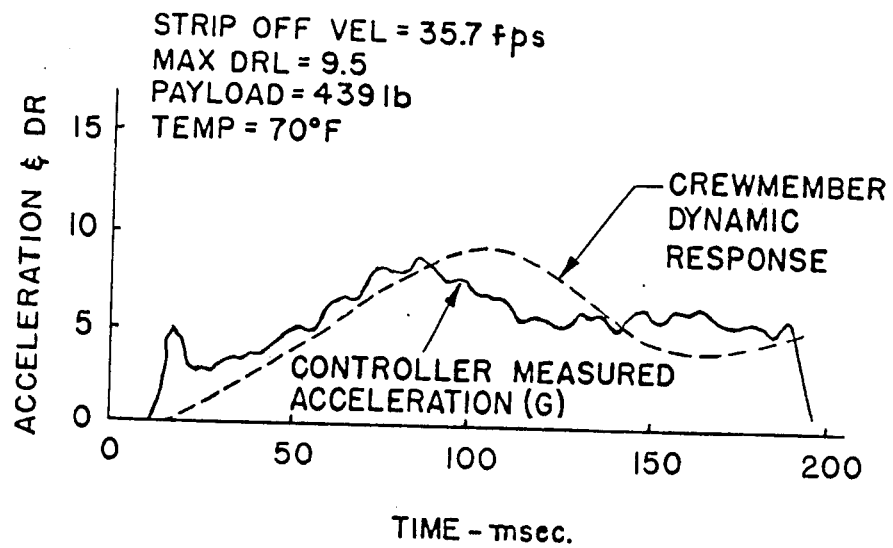
Figure 10:
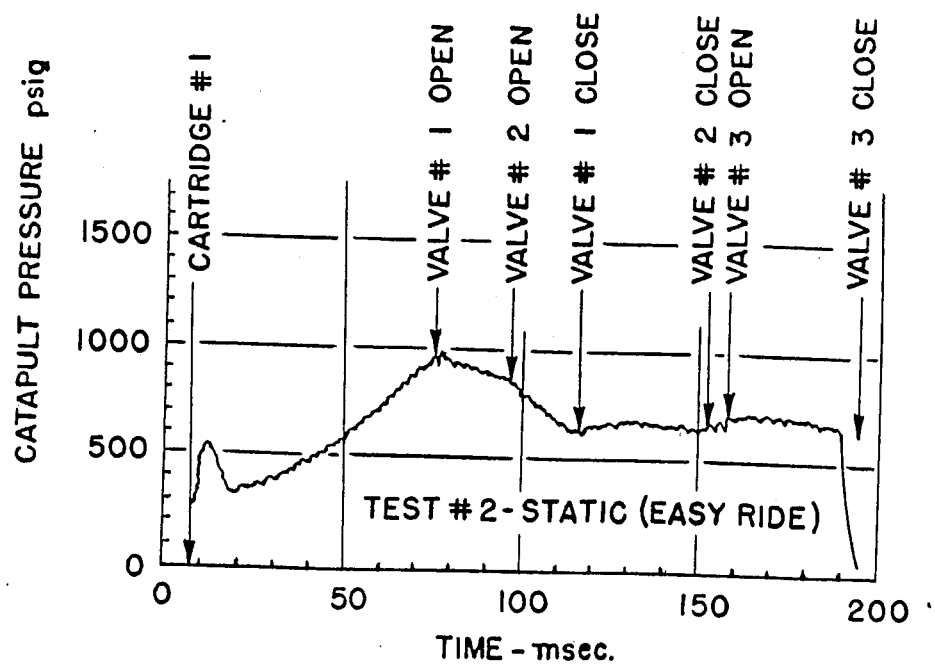

FIGS. 9 and 10 are charts of a final test of the invention. This was an "Easy Ride" test case that had a DRI target of 10.0. This was accomplished by changing the DRLC (Dynamic Response Limit Control) value stored in the controller memory from 16.0 to 10.0. An advanced ejection seat system with adaptable performance capabilities could make a risk assessment prior to ejection and then select an appropriate value for DRLC. The payload was 439 lbs and the temperature was 70° F. Only one propellant cartridge was ignited and three shuttle valves opened and two closed during the catapult stroke. The third valve closed just after catapult separation. The velocity at catapult separation was 36 fps and the DRI was 9.5. FIG. 9 illustrates the catapult acceleration and dynamic response versus time; and FIG. 10 illustrates the catapult pressure and control sequence of events versus time.

The ejection seat catapult of the present invention is capable of ejecting a pilot and seat from an aircraft, so that the thrust of the catapult is controlled to prevent injury to the pilot due to acceleration forces.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A seat ejection system which is fixed to an ejection seat and is capable of ejecting said ejection seat with controllable acceleration, said seat ejection system comprising:

a means for controlling said seat ejection system which is electronically connected to said seat ejection system and monitors its acceleration, said controlling means sending a first set of signals to increase acceleration if it is inadequate, said controlling means sending a second set of signals to decrease acceleration when it is too great;

a frame which is attached to said ejection seat and said controlling means;

a main catapult tube which is attached to said frame;

a piston housed within said main catapult tube which drives said frame and said ejection seat to eject when solid propellant combusts within said frame;

a first solid propellant charge which is attached to said frame and provides solid propellant to combust within said tube when ejection is required;

a means for providing additional propellant when increased acceleration is required, said providing means thereby increasing the acceleration when receiving said first set of signals from said controlling means; and a means for venting pressure from said main catapult tube when receiving said second set of signals from said controlling means, said venting means thereby providing decreased acceleration when required.

2. A seat ejection system, as defined in claim 1, wherein said providing means comprises a second solid propellant charge which is fixed to said frame adjacent to said main catapult tube and provides additional solid propellant for combustion when receiving said first set of signals from said controlling means.

3. A seat ejection system, as defined in claim 2, wherein said venting means comprises a plurality of controllable vents housed in said main catapult tube, said controllable vents being closed unless receiving said second set of signals from said controlling means.

* * * * *